(12) United States Patent
Lee et al.

(10) Patent No.: US 11,991,174 B2
(45) Date of Patent: May 21, 2024

(54) AUTHENTICATION SYSTEM WITH AN AUTOMATIC AUTHENTICATION MECHANISM AND AUTOMATIC AUTHENTICATION METHOD

(71) Applicant: GoTrustID Inc., Irvine, CA (US)

(72) Inventors: Darren Tien-Chi Lee, Irvine, CA (US); Jeng-Lung Li, Taichung (TW); Ramesh Kesanupalli, Irvine, CA (US)

(73) Assignee: GoTrustID Inc., Irvine, CA (US)

( * ) Notice: Subject to any disclaimer, the term of this patent is extended or adjusted under 35 U.S.C. 154(b) by 349 days.

(21) Appl. No.: 17/676,785

(22) Filed: Feb. 21, 2022

(65) Prior Publication Data

US 2022/0337589 A1 Oct. 20, 2022

Related U.S. Application Data

(60) Provisional application No. 63/175,057, filed on Apr. 15, 2021.

(51) Int. Cl.
 *H04L 9/40* (2022.01)
 *H04L 12/66* (2006.01)

(52) U.S. Cl.
 CPC .......... *H04L 63/0876* (2013.01); *H04L 12/66* (2013.01)

(58) Field of Classification Search
 CPC ........ H04L 9/40; H04L 63/0876; H04L 12/66
 See application file for complete search history.

(56) References Cited

U.S. PATENT DOCUMENTS

| | | | |
|---|---|---|---|
| 10,075,437 B1* | 9/2018 | Costigan | H04L 63/166 |
| 2017/0353859 A1* | 12/2017 | Idnani | H04W 12/08 |
| 2019/0036924 A1* | 1/2019 | Wang | H04W 76/10 |
| 2019/0124081 A1* | 4/2019 | Nowak | H04L 63/0892 |

* cited by examiner

*Primary Examiner* — Jayesh M Jhaveri
(74) *Attorney, Agent, or Firm* — JCIPRNET

(57) ABSTRACT

An authentication system with an automatic authentication mechanism and an automatic authentication method are provided. The authentication system includes a server device and a gateway device. The gateway device is coupled to the server device. The gateway device is configured to act as a fast identity online (FIDO) client to send a gateway device registration data to register the gateway device in the server device acting as a FIDO server, and then the gateway device defines itself as initialized and connected. The gateway device periodically sends data to server device for authentication to maintain a trusted connection between the server device and the gateway device.

18 Claims, 6 Drawing Sheets

AUTHENTICATION SYSTEM WITH AN AUTOMATIC AUTHENTICATION MECHANISM AND AUTOMATIC AUTHENTICATION METHOD

CROSS-REFERENCE TO RELATED APPLICATION

This application claims the priority benefit of U.S. Provisional Application Ser. No. 63/175,057, filed on Apr. 15, 2021. The entirety of the above-mentioned patent application is hereby incorporated by reference herein and made a part of this specification.

BACKGROUND

Technical Field

The disclosure relates to a system, and particularly relates to an authentication system with an automatic authentication mechanism and an automatic authentication method.

Description of Related Art

In recent years, the development of Internet of Things (IoT) system has become more and more important, especially for realizing IoT applications in the home environment. In this regard, multiple IoT devices of a traditional IoT system can be connected to the IoT server, so that the IoT server can collect and manage its IoT information. However, the traditional IoT system must manually set the information of each IoT device and the connection information to establish a connection between multiple IoT devices and IoT servers by manual setting by engineers. Even if the user wants to operate the user device to connect to the IoT system, the connection between the user device and the IoT system must also be manually set by the engineer. More importantly, the traditional IoT system also has the shortcomings of lack of security of information security protection and no identity verification function, which leads to the problem of poor security of the traditional IoT system.

SUMMARY

The disclosure is directed to an authentication system with an automatic authentication mechanism and an automatic authentication method, and can provide an effectively automatic authentication function.

An authentication system with an automatic authentication mechanism of the disclosure includes a server device and a gateway device. The gateway device is coupled to the server device. The gateway device is configured to act as a fast identity online (FIDO) client to send a gateway device registration data to register the gateway device in the server device acting as a FIDO server, and then the gateway device defines itself as initialized and connected. The gateway device periodically sends data to server device for authentication to maintain a trusted connection between the server device and the gateway device.

In an embodiment of the disclosure, the data includes a gateway device login credential including a gateway device identity data, so that the server device utilizes the gateway device registration data to authenticate the gateway device identity data and maintain the trusted connection between the server device and the gateway device.

In embodiment of the disclosure, the authentication system further includes an user device. The user device is coupled to the gateway device. When the user device performs a registration operation, the user device acts as the FIDO client to send a user device registration data to the gateway device acting as the FIDO server, and the gateway device determines whether the user device is successfully registered by checking the user device registration data.

In embodiment of the disclosure, the gateway device searches a local credential database of the gateway device to confirm whether the user device registration data is identifiable or meets a registration policy so as to perform the registration operation. When the gateway device determines that the user device is not identifiable or meets the registration policy, the gateway device further searches a server credential database of the server device to confirm again whether the user device registration data is identifiable or meets the registration policy so as to perform the registration operation by the gateway device.

In embodiment of the disclosure, when the gateway device determines that the user device is identifiable or meets the registration policy, the gateway device stores the user device registration data into the local credential database, and the gateway device synchronizes the user device registration data to the server credential database.

In embodiment of the disclosure, the registration operation includes the following operations: the user device notices the server device to start registration; the server device sends an authorized data to the user device; the user device sends the user device registration data and the authorized data to the gateway device; the gateway device sends the user device registration data and the authorized data to the gateway device; the server device validates the user device according to the authorized data to grant registration; and the gateway device sends a registration success information back to the user device.

In embodiment of the disclosure, the user device determines whether an identity verification is passed so as to send the user device registration data to the gateway device, and the identity verification comprises at least one of a biometric verification and a pin verification provided by the user device.

In embodiment of the disclosure, when the user device perform a login operation, the user device acts as the FIDO client to send a user device login credential to the gateway device acting as the FIDO server. The user device login credential comprises a user device identity data, and the gateway device utilizes the user device registration data to authenticate the user device identity data.

In embodiment of the disclosure, the gateway device searches a local credential database of the gateway device to obtain the user device registration data for determining whether the user device can be authenticated according to the user device identity data. When the gateway device determines that the user device is not identifiable, the gateway device further searches a server credential database of the server device to obtain the user device registration data for determining whether the user device can be authenticated according to the user device identity data.

In embodiment of the disclosure, the gateway device is an Internet of Things (IoT) device, and the gateway device allows a plurality of user devices to login at the same time. The server device allows maintaining a plurality of trusted connections with a plurality of gateway devices at the same time.

An automatic authentication method of the disclosure includes following steps: coupling to a server device by a gateway device; configuring the gateway device to act as a FIDO client to send a gateway device registration data to register the gateway device in the server device acting as a FIDO server; configuring the gateway device to define itself as initialized and connected; and periodically sending data to server device for authentication to maintain a trusted connection between the server device and the gateway device by the gateway device.

Based on the above, according to the authentication system with the automatic authentication mechanism and the automatic authentication method of the disclosure, the gateway device can automatically establish the trusted connection with the server device based on an authentication mechanism of the FIDO protocol, and can effectively maintain the trusted connection.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

It is to be understood that other embodiments may be utilized and structural changes may be made without departing from the scope of the disclosure. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "electrically connected," and variations thereof herein are used broadly and encompass direct and indirect connections, couplings, and mountings.

Figure 1:
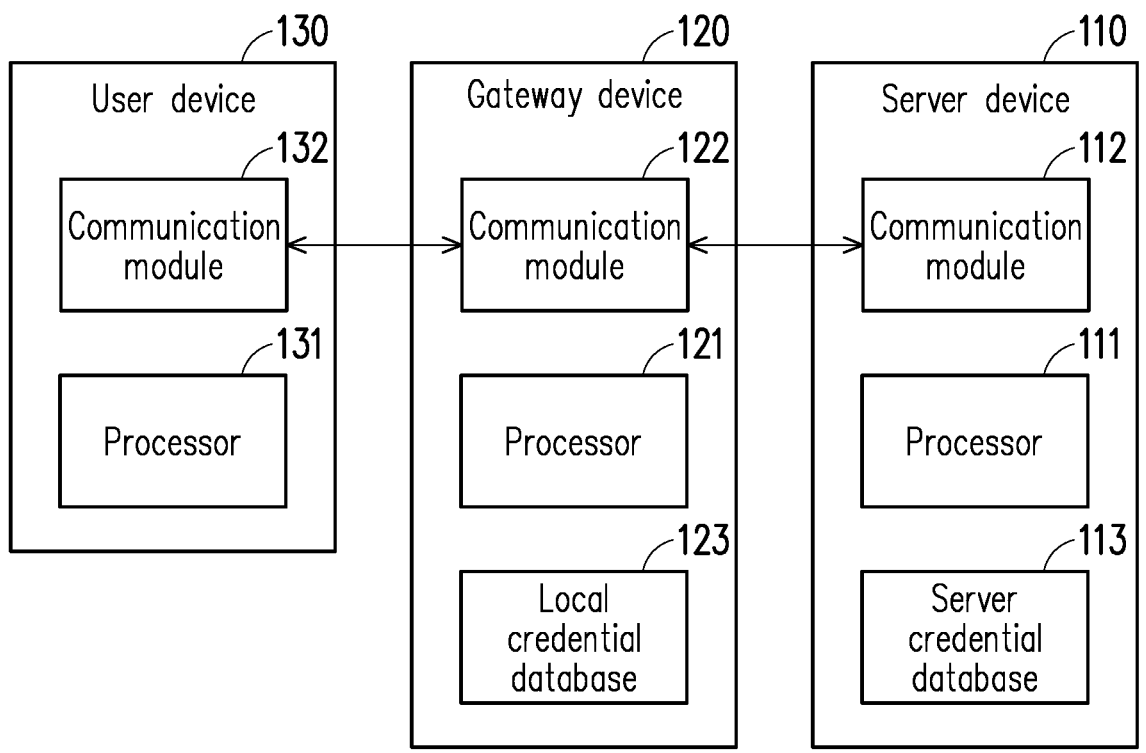
FIG. 1 is a schematic diagram illustrating an authentication system according to an embodiment of the disclosure.

FIG. 1 is a schematic diagram illustrating an authentication system according to an embodiment of the disclosure. Referring to FIG. 1, the authentication system 100 includes a server device 110, a gateway device 120, and a user device 130. The server device 110 includes a processor 111, a communication module 112, and a server credential database 113. The gateway device 120 includes a processor 121, a communication module 112, and a local credential database 123. The user device 130 includes a processor 131 and a communication module 132. The processor 111 of the server device 110, the processor 121 of the gateway device 120, and the processor 131 of the user device 130 may respectively execute some commands or programs related to a fast identity online (FIDO) protocol (which may be FIDO 1.0 or FIDO 2.0), so as to implement the registration operations of the gateway device 120 and the user device 130, and execute an authentication operation of the user device 130. The memories of the server device 110, the gateway device 120, and the user device 130 may pre-store the some commands or programs related to the FIDO protocol. In the embodiment of the disclosure, the server device 110 may further store the server credential database 113, and the gateway device 120 may further store the local credential database 123.

In the embodiment of the disclosure, the communication module 112, 122, and 132 may respectively, for example, include Wi-Fi communication interface, Bluetooth communication interface, or other wireless communication interface or other wired communication interface. In the embodiment of the disclosure, the gateway device 120 may automatically search the server device 110 by the communication module 122, and automatically establish the trusted connection with the server device 110 based on the FIDO protocol. The gateway device 120 may maintain the trusted connection between the server device 110 and the gateway device 120. That is, the server device 110 may automatically authenticate the identification of the gateway device 120. Then, the user may operate the user device 130 to search the gateway device 120 the communication module 132, and register the user device 130 in the gateway device 120 based on the FIDO protocol. After the registration of the user device 130 is success, the gateway device 120 may automatically authenticate the user device 130 based on the FIDO protocol when the user device 130 is connected to the gateway device 120. Therefore, the authentication system 100 of the disclosure may provide a secure device connection architecture.

In the embodiment of the disclosure, the processors 111, 121, and 131 may each be a Central Processing Unit (CPU), a microprocessor, a Digital Signal Processor (DSP), Programmable Logic Controller (PLC), an Application Specific Integrated Circuit (ASIC), a System on Chip (SoC), or other similar elements, or a combination of the above elements, and the present disclosure is not limited thereto. The memories of the server device 110, a gateway device 120, and a user device 130 may each be a Dynamic Random Access Memory (DRAM), a flash memory or a Non-Volatile Random Access Memory (NVRAM), and the present disclosure is also not limited thereto. The type of the processors 111, 121, and 131 and the corresponding memories are respectively determined according to the types of electronic devices.

Figure 2:
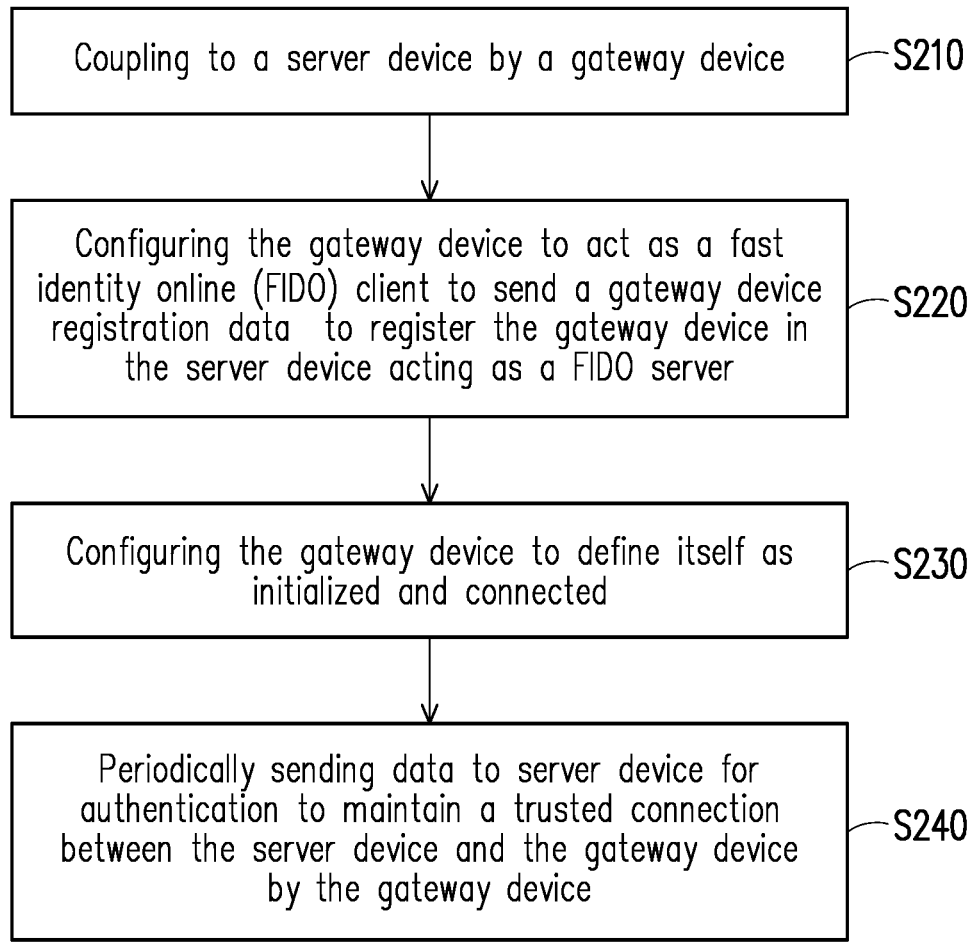
FIG. 2 is a flowchart illustrating an automatic authentication method according to an embodiment of the disclosure.

FIG. 2 is a flowchart illustrating an automatic authentication method according to an embodiment of the disclosure. Referring to FIG. 1 and FIG. 2, the authentication system 100 may perform the following steps S210 to S240 to implement the automatic authentication function. In step S210, the gateway device 120 may couple to the server device 110. In the embodiment of the disclosure, the gateway device 120 automatically search and connect to the server device 110 by the communication module 122. In step S220, the gateway device 120 may be configured by the processor 121 to act as a FIDO client to send a gateway device registration data to register the gateway device 120 in the sever device 110 acting as a FIDO server. In the embodiment of the disclosure, the connection between the server device 110 and the gateway device 120 is established based on the FIDO protocol. The server credential database 113 of the server device 110 may store the credential data of the gateway device 120 according to the gateway device registration data.

In step S230, the gateway device 120 may be configured by the processor 121 to define itself as initialized and connected. In step S240, the gateway device 120 may periodically send data to the server device 110 for authentication to maintain the trusted connection between the server device 110 and the gateway device 120. In the embodiment of the disclosure, the gateway device 120 may periodically execute the authentication operation of the FIDO protocol to the server device 110, so that the server device 110 may continuously renew the credential data of the gateway device 120 stored in the server credential database 113, so to ensure that the connection between the server device 110 and the gateway device 120 is safety and trustworthy.

Furthermore, in the embodiment of the disclosure, for the user device 130, the gateway device 120 may act as the FIDO server, and the user device 130 may act as the FIDO client. Based on the condition of the trusted connection between the server device 110 and the gateway device 120, the user device 130 may connect to the gateway device 120 for registration and authentication, so that the registration data of the user device 130 may store into the local credential database 123 of the gateway device 120 and the server credential database 113 of the server device 110. Therefore, the authentication system 100 and the automatic authentication method of the embodiment can implement the automatic authentication mechanism and establish the secure and effective connection.

Figure 3:
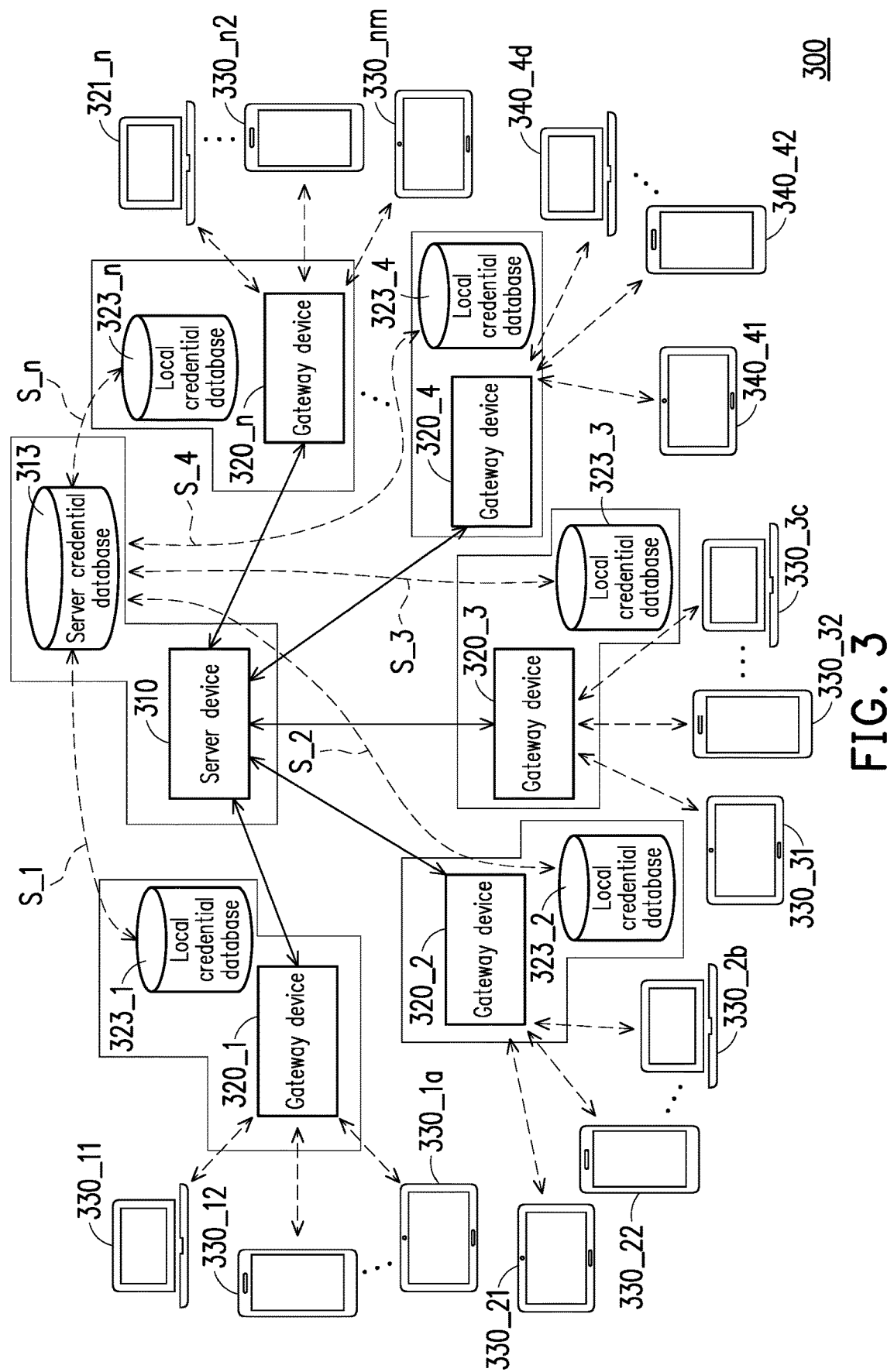
FIG. 3 is a schematic diagram illustrating an authentication system according to another embodiment of the disclosure.

FIG. 3 is a schematic diagram illustrating an authentication system according to another embodiment of the disclosure. Referring to FIG. 3, the authentication system 300 includes a server device 310, a plurality of gateway devices 320_1~320_n, and a plurality of user devices 330_11~330_1a, 330_21~330_2b, 330_31~330_3c, 330_41~330_4d, . . . , 330_n1~330_nm, where a, b, c, d to m and n are a positive integer respectively. In the embodiment of the disclosure, the server device 310 may be a home server disposed in a home environment or a cloud server. The gateway devices 320_1~320_n may be a plurality of Internet of Things (IoT) devices respectively. In the embodiment of the disclosure, the gateway devices 320_1~320_n may respectively connect to the user devices 330_11~330_nm. The user devices 330_11~330_nm may include a plurality of terminal devices and/or a plurality of micro IoT devices. The terminal devices may include, for example, a person computer (PC), a mobile phone, and/or tablet computer, etc. In the embodiment of the disclosure, the gateway devices 320_1~320_n may connect to the server device 310 by an internet such as a local area network (LAN), a home area network, or a wide area network (WAN), etc., or a physical cable. The user devices 330_11~330_nm may also connect to the corresponding gateway devices 320_1~320_n by the internet. It should be noted that, any one of the user devices 330_11~330_nm may connect and login to one or more nearest gateway devices.

In the embodiment of the disclosure, the gateway devices 320_1~320_n may automatically execute the registration operation as the above embodiments of FIG. 1 and FIG. 2, so as to register in the server device 310 based on the FIDO protocol. Thus, the server credential database 313 of the server device 310 may store a plurality of registration data of the gateway devices 320_1~320_n, and the server device 310 can effectively manage the gateway devices 320_1~320_n according to the registration data. Moreover, the server device 310 may allow the automatic authentications from the gateway devices 320_1~320_n based on registration data. That is, the gateway devices 320_1~320_n may share or upload, for example, an IoT information or a sensor information to the server device 310.

In the embodiment of the disclosure, the gateway devices 320_1~320_n may accept the registration operations from the user devices 330_11~330_nm based on the FIDO protocol, so as to record the registration data of the user devices 330_11~330_nm into the local credential databases 323_11~323_n of the gateway devices 320_1~320_n. The synchronous operations S_1~S_n may be performed between the local credential databases 323_11~323_n and the server credential database 313 (One-way synchronization or Two-way synchronization), so as to synchronous upload the registration data to the server credential database 313 of the server device 310, or synchronous download the registration data to the local credential databases 323_11~323_n of the gateway devices 320_1~320_n. Thus, when a user device is connected to any one of the gateway devices 320_1~320_n, the any one of the gateway devices 320_1~320_n can automatic authenticate the identification of the user device based on the FIDO protocol, so as to allow the user device can access data into the gateway devices 320_1~320_n, can control the gateway devices 320_1~320_n, or can obtain the IoT information or the sensor information of the gateway devices 320_1~320_n.

For example, when the user device 330_11 wants to register to the gateway device 320_1, the gateway device 320_1 may ask the server device 310 to confirm whether to allow the user device 330_11 to register to the gateway device 320_1. Then, when the user device 330_11 is success to register to the gateway device 320_1, the local credential database 323_1 of the gateway device 320_1 may store the registration data of the user device 330_11 and synchronous update the registration data of the user device 330_11 to the server credential database 313 of the server device 310. Thus, when the user device 330_11 connects to the gateway device 320_1 or other gateway device and wants to login or re-register to the gateway device 320_1 or other gateway device, the gateway device 320_1 or other gateway device may first search the corresponding local credential database. If the corresponding local credential database does not store the corresponding registration data, the gateway device 320_1 or other gateway device may further search the server credential database 313 through the server device 310 to confirm whether the data provided by the gateway device 320_1 complies with the authentication or registration policy, and then allow the user device 330_11 to login or re-register to the gateway device 320_1 or other gateway device.

Therefore, the gateway devices 320_1~320_n of the embodiment may respectively allow user devices 330_11~330_nm to login at the same time, and the server device 310 may allow maintaining a plurality of trusted connections with the gateway devices 320_1~320_n at the same time. More importantly, the authentication system 300 of the embodiment can implement the automatic IoT authentication mechanism and establish the secure and effective IoT connection based on the FIDO protocol.

Figure 4:
FIG. 4 is a schematic diagram illustrating a registration operation of a gateway device according to an embodiment of the disclosure.

FIG. 4 is a schematic diagram illustrating a registration operation of a gateway device according to an embodiment of the disclosure. Referring to FIG. 4, this embodiment is used to illustrate the registration operation of the gateway device of the present invention. In the embodiment of the disclosure, a server device 410 and a gateway device 420 may execute the following steps S410~S440 to perform the registration operation of the gateway device 420. In the embodiment of the disclosure, the gateway device 420 may act as the FIDO Client, and the server device 410 may act as the FIDO server. In step S410, the gateway device 420 may send a gateway device registration data to the server device 410. The gateway device registration data may include the gateway device identification and public key. In step S420, the server device 410 stores the gateway device registration data (and related identification information) into the server credential database of the server device 410. In step S430, the server device 410 may send a notice signal for the gateway device 420 to notice that the registration is passed. In step S440, the gateway device 420 may periodically send data including a gateway device login credential to server device 410 for authentication to maintain a trusted connection between the server device 410 and the gateway device 420. In the embodiment of the disclosure, the data including the gateway device login credential may include a gateway device identity data, so that the server device 410 may utilize the gateway device registration data to authenticate the gateway device identity data and maintain the trusted connection between the server device 410 and the gateway device 420 based on the FIDO protocol. In the embodiment of the disclosure, the gateway device identity data may further include at least one of a gateway device identification, a privately key, and a stamp data. Therefore, the server device 410 and the gateway device 420 of the embodiment can establish the safe and reliable connection between the server device 410 and the gateway device 420 based on the FIDO protocol.

Figure 5:
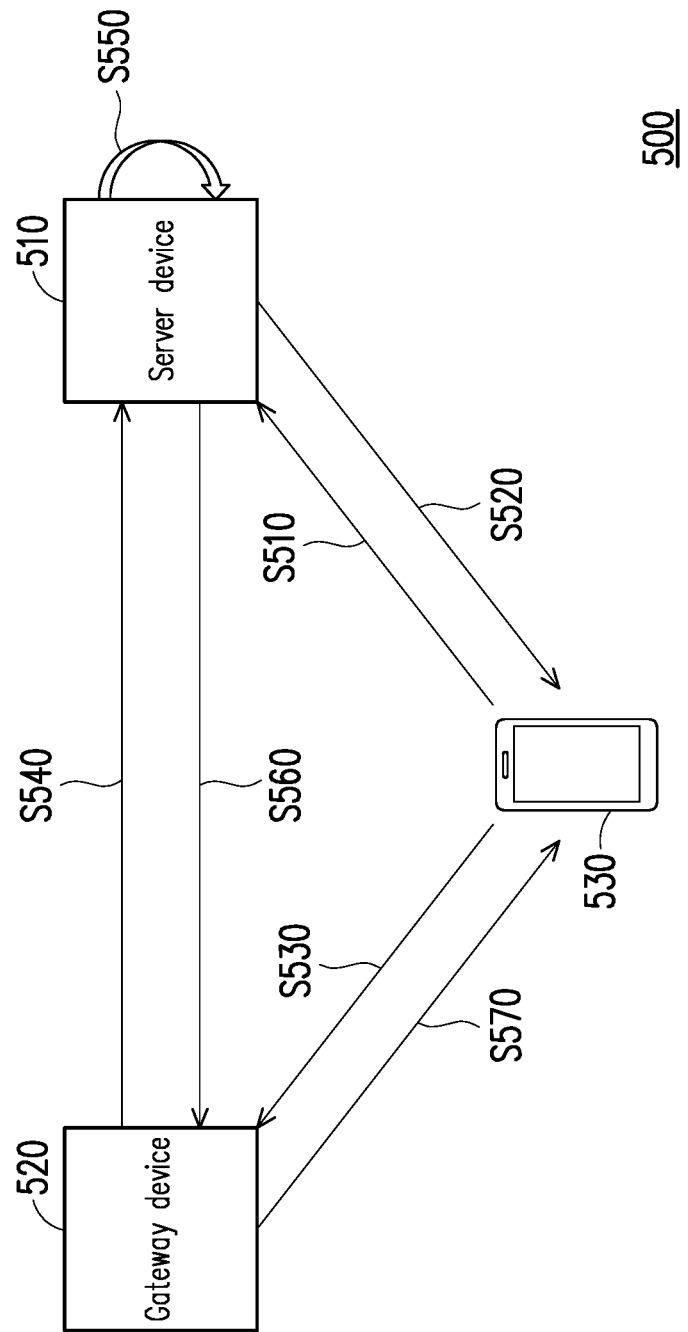
FIG. 5 is a schematic diagram illustrating a registration operation of a user device according to an embodiment of the disclosure.

FIG. 5 is a schematic diagram illustrating a registration operation of a user device according to an embodiment of the disclosure. Referring to FIG. 5, this embodiment is used to illustrate the registration operation of the user device of the present invention. In the embodiment of the disclosure, an authentication system 500 may execute the following steps S510~S560 to perform the registration operation of the user device 530. The authentication system 500 includes a server device 510, a gateway device 520, and a user device 530. In the embodiment of the disclosure, the user device 530 may act as the FIDO client, and the gateway device 520 may act as the FIDO server. In step S510, the user device 530 may notices the server device to start registration. In the embodiment of the disclosure, the user may initialize registration to the server device 510 by operating the user device 530 to communicate with the server device 510. In step S520, the server device 510 may send an authorized data such as a user ID, an initialization code, or a one-time-passcode by an authorized email or a short message service (SMS) to the user device 530. In step S530, the user device 530 may send a user device registration data and the authorized data to the gateway device 520. In the embodiment of the disclosure, the user device 530 may determine whether the identity verification is passed so as to send the user device registration data and the authorized data to the gateway device 520. The user device registration data may include a user device identification and/or a public key. The identity verification may include at least one of a biometric verification and a pin verification provided by the user device 530. In step S540, the server device 510 may validate the user device 530 according to the authorized data to grant registration. The gateway device 520 may determine whether the user device 530 is successfully registered by checking the user device registration data based on the FIDO protocol.

In the embodiment of the disclosure, the gateway device 520 may searches a local credential database of the gateway device 520 to confirm whether the user device registration data is identifiable or meets a registration policy of the FIDO protocol so as to perform the registration operation. When the gateway device 520 determines that the user device 530 is not identifiable or meets the registration policy, the gateway device 520 further searches the server credential database of the server device 510 to confirm again whether the user device registration data is identifiable or meets the registration policy so as to perform the registration operation by the gateway device 520. When the gateway device 520 determines that the user device 530 is identifiable or meets the registration policy, the gateway device 520 stores the user device registration data into the local credential database of the server device 510, and the gateway device 520 synchronizes the user device registration data to the server credential database of the server device 510.

In step S550, the server device 510 may validate the user device 530 according to the authorized data to grant registration based on the FIDO protocol. In step S560, the server device 510 may send a notice signal for the gateway device 520 to notice that the registration is passed. In step S570, the gateway device 520 may send a registration success information back to the user device 530. Therefore, the authentication system 500 of the disclosure may provide a secure device connection architecture based on the FIDO protocol.

Figure 6:
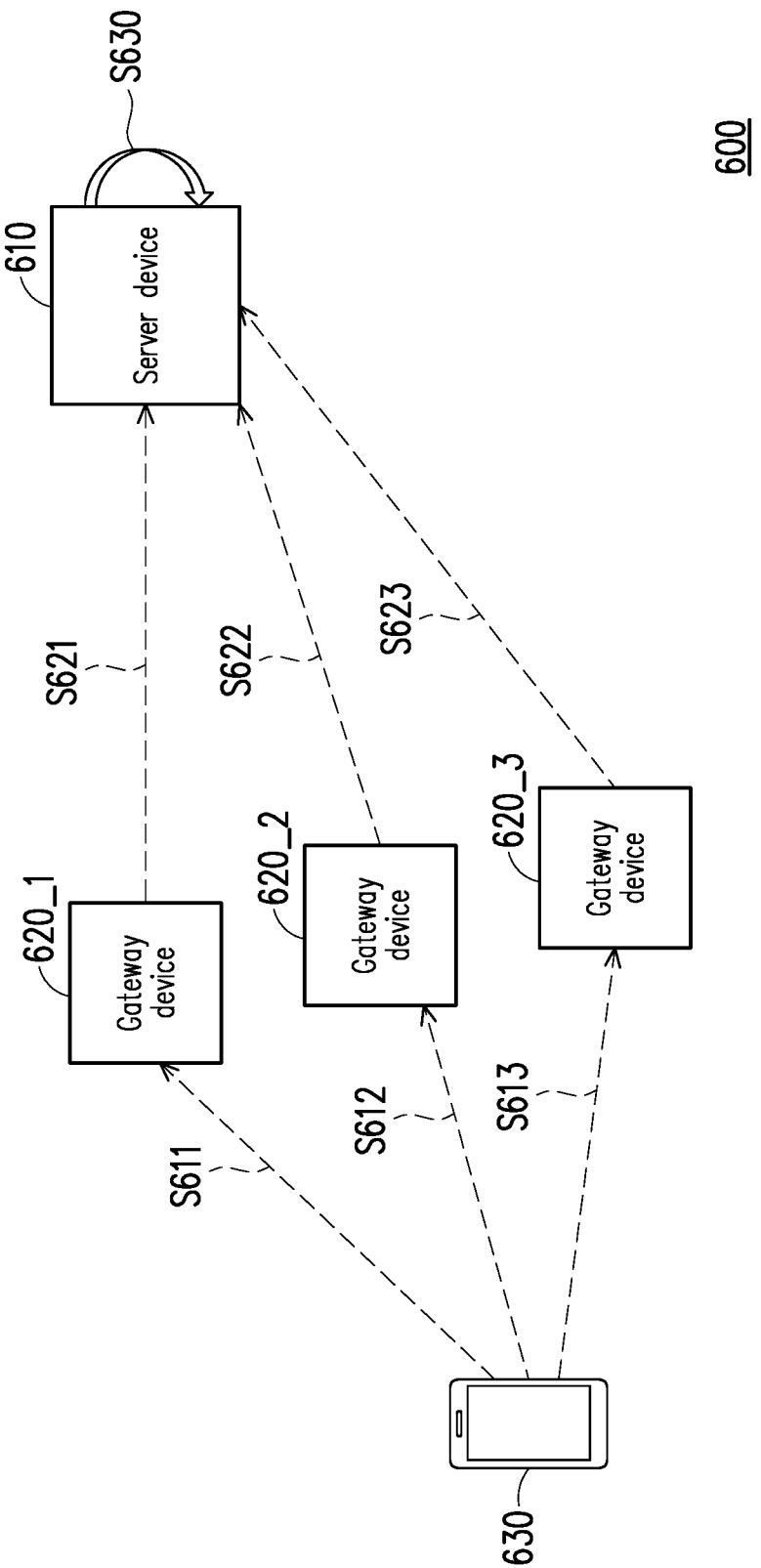
FIG. 6 is a schematic diagram illustrating an authentication operation of a user device according to an embodiment of the disclosure.

FIG. 6 is a schematic diagram illustrating an authentication operation of a user device according to an embodiment of the disclosure. Referring to FIG. 6, this embodiment is used to illustrate the authentication operation of the user device of the present invention. In the embodiment of the disclosure, an authentication system 600 may execute the following steps S611~S630 to perform the authentication operation of the user device 630. In the embodiment of the disclosure, the user device 630 may be close to multiple gateway devices 620_1~620_3. In steps S611~S613, when the user device 630 performs login operations on the gateway devices 620_1~620_3, the user device 630 acts as the FIDO client to respectively send a corresponding user device login credential to the gateway devices 620_1~620_3 which are nearest the user device 630. The user device login credential may include a user device identity data and a privately key. The gateway devices 620_1~620_3 may respectively utilizes the corresponding user device registration data to authenticate the user device identity data based on the FIDO protocol. The gateway devices 620_1~620_3 may respectively search the corresponding local credential database to obtain the corresponding user device registration data for determining whether the user device can be authenticated according to the user device identity data.

It should be noted that, in one embodiment, the server device 610 may push an allowed list (or whitelist) for the gateway devices 620_1~620_3, so that the gateway devices 620_1~620_3 may check whether the user device 630 can login or register to the gateway devices 620_1~620_3. The allowed list may include an allowed user device identification information (may include the user device identity data) and/or credential data. In steps S621~S623, when at least one of the gateway devices 620_1~620_3 determines that the user device is not identifiable or not find the user device registration data, the at least one of the gateway devices 620_1~620_3 may further search the server credential database of the server device 610 to obtain the corresponding user device registration data for determining whether the user device 630 can be authenticated according to the user device identity data based on the FIDO protocol. Moreover, in step S630, the at least one of the gateway devices 620_1~620_3 may further ask the server device 610 to validate the user device 630 based on the FIDO protocol, because the user device 630 may be newly connected to the at least one of the gateway devices 620_1~620_3. Therefore, the authentication system 600 of the embodiment can implement the automatic authentication mechanism based on the FIDO protocol.

In summary, the authentication system with the automatic authentication mechanism and the automatic authentication method of the disclosure can establish the secure device connection architecture between the server device, the gateway devices, and the user devices based on the FIDO protocol. Moreover, the authentication system and the automatic authentication method of the disclosure can implement the automatic authentication function based on the FIDO protocol.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. An authentication system with an automatic authentication mechanism comprising:
    a server device;
    a gateway device, coupled to the server device; and
    a user device, coupled to the gateway device,
        wherein the gateway device is configured to act as a fast identity online (FIDO) client based on a FIDO protocol to send a gateway device registration data to register the gateway device in the server device acting as a FIDO server, and then the gateway device defines itself as initialized and connected,
        wherein the gateway device periodically sends data to the server device for authentication to maintain a trusted connection between the server device and the gateway device based on the FIDO protocol,
        wherein when the user device, based on the FIDO protocol, performs a registration operation, the user device acts as the FIDO client to send a user device registration data to the gateway device acting as the FIDO server, and the gateway device determines whether the user device is successfully registered by checking the user device registration data.

2. The authentication system according to the claim 1, wherein the data comprises a gateway device login credential comprising a gateway device identity data, so that the server device utilizes the gateway device registration data to authenticate the gateway device identity data and maintain the trusted connection between the server device and the gateway device.

3. The authentication system according to the claim 1, wherein the gateway device searches a local credential database of the gateway device to confirm whether the user device registration data is identifiable or meets a registration policy so as to perform the registration operation,
    wherein when the gateway device determines that the user device is not identifiable or meets the registration policy, the gateway device further searches a server credential database of the server device to confirm again whether the user device registration data is identifiable or meets the registration policy so as to perform the registration operation by the gateway device.

4. The authentication system according to the claim 3, wherein when the gateway device determines that the user device is identifiable or meets the registration policy, the gateway device stores the user device registration data into the local credential database, and the gateway device synchronizes the user device registration data to the server credential database.

5. The authentication system according to the claim 3, wherein the registration operation comprises:
    the user device notices the server device to start registration;
    the server device sends an authorized data to the user device;
    the user device sends the user device registration data and the authorized data to the gateway device;
    the gateway device sends the user device registration data and the authorized data to the gateway device;
    the server device validates the user device according to the authorized data to grant registration; and
    the gateway device sends a registration success information back to the user device.

6. The authentication system according to the claim 5, wherein the user device determines whether an identity verification is passed so as to send the user device registration data to the gateway device, and the identity verification comprises at least one of a biometric verification and a pin verification provided by the user device.

7. The authentication system according to the claim 1, wherein when the user device perform a login operation, the user device acts as the FIDO client to send a user device login credential to the gateway device acting as the FIDO server, wherein the user device login credential comprises a user device identity data, and the gateway device utilizes the user device registration data to authenticate the user device identity data.

8. The authentication system according to the claim 7, wherein the gateway device searches a local credential database of the gateway device to obtain the user device registration data for determining whether the user device can be authenticated according to the user device identity data,
    wherein when the gateway device determines that the user device is not identifiable, the gateway device further searches a server credential database of the server device to obtain the user device registration data for determining whether the user device can be authenticated according to the user device identity data.

9. The authentication system according to the claim 1, wherein the gateway device is an Internet of Things (IoT) device, and the gateway device allows a plurality of user devices to login at the same time, wherein the server device allows maintaining a plurality of trusted connections with a plurality of gateway devices at the same time.

10. An automatic authentication method, comprising:
    coupling to a server device by a gateway device;
    configuring the gateway device to act as a fast identity online (FIDO) client based on a FIDO protocol to send a gateway device registration data to register the gateway device in the server device acting as a FIDO server;
    configuring the gateway device to define itself as initialized and connected;
    periodically sending data to the server device for authentication to maintain a trusted connection between the server device and the gateway device by the gateway device based on the FIDO protocol;
    coupling to the gateway device by a user device;

when a user device, based on the FIDO protocol, performs a registration operation, sending a user device registration data to the gateway device acting as the FIDO server by the user device acting as the FIDO client; and determining whether the user device is successfully registered by checking the user device registration data by the gateway device.

11. The automatic authentication method according to the claim 10, wherein the data comprises a gateway device login credential comprising a gateway device identity data, and the automatic authentication method further comprises:

utilizing the gateway device registration data to authenticate the gateway device identity data and maintain the trusted connection between the server device and the gateway device by the server device; and determining whether trusted connection between the server device by the server device.

12. The automatic authentication method according to the claim 10, wherein the step of determining whether the user device is successfully registered comprises:

searching a local credential database of the gateway device to confirm whether the user device registration data is identifiable or meets a registration policy so as to perform the registration operation by the gateway device; and when the gateway device determines that the user device is not identifiable or meets the registration policy, further searching a server credential database of the server device to confirm again whether the user device registration data is identifiable or meets the registration policy so as to perform the registration operation by the gateway device.

13. The automatic authentication method according to the claim 12, comprising:

when the gateway device determines that the user device is identifiable or meets the registration policy, the gateway device stores the user device registration data into the local credential database, and the gateway device synchronizes the user device registration data to the server credential database.

14. The automatic authentication method according to the claim 12, wherein the registration operation comprises:

notifying the server device to start registration by the user device;

sending an authorized data to the user device by the server device;

sending the user device registration data to the gateway device and the authorized data by the user device;

sending the user device registration data and the authorized data to the server device by the gateway device;

validating the user device according to the authorized data to grant registration by the server device; and sending a registration success information back to the user device by the gateway device.

15. The automatic authentication method according to the claim 14, wherein the registration operation further comprises:

determining whether an identity verification is passed by the user device, so as to send the user device registration data to the gateway device, wherein the identity verification comprises at least one of a biometric verification and a pin verification provided by the user device.

16. The automatic authentication method according to the claim 10, wherein when the user device perform a login operation, the automatic authentication method further comprises:

sending a user device login credential to the gateway device acting as the FIDO server by the user device acting as the FIDO client, wherein the user device login credential comprises a user device identity data; and utilizing the user device registration data to authenticate the user device identity data by the gateway device.

17. The automatic authentication method according to the claim 16, wherein the step of utilizing the user device registration data to authenticate the user device identity data by the gateway device comprises:

searching a local credential database of the gateway device to obtain the user device registration data for determining whether the user device can be authenticated according to the user device identity data by the gateway device; and when the gateway device determines that the user device is not identifiable, further searching a server credential database of the server device to obtain the user device registration data for determining whether the user device can be authenticated according to the user device identity data by the gateway device.

18. The automatic authentication method according to the claim 10, wherein the gateway device is an Internet of Things (IoT) device, and the gateway device allows a plurality of user devices to login at the same time, wherein the server device allows maintaining a plurality of trusted connections with a plurality of gateway devices at the same time.

* * * * *